(12) United States Patent
Achuthan Kutty et al.

(10) Patent No.: US 12,612,012 B2
(45) Date of Patent: Apr. 28, 2026

(54) VEHICLE ACCESS SYSTEMS AND METHODS

(71) Applicant: FCA US LLC, Auburn Hills, MI (US)

(72) Inventors: Santhosh Achuthan Kutty, Bangalore (IN); Rejani Syamala, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 76 days.

(21) Appl. No.: 18/456,043

(22) Filed: Aug. 25, 2023

(65) Prior Publication Data

US 2025/0065841 A1 Feb. 27, 2025

(51) Int. Cl.
B60R 25/24 (2013.01)
B60R 25/30 (2013.01)
G06K 19/06 (2006.01)

(52) U.S. Cl.
CPC .......... B60R 25/241 (2013.01); B60R 25/305 (2013.01); B60R 2325/108 (2013.01); G06K 19/06037 (2013.01)

(58) Field of Classification Search
CPC ............... B60R 25/241; B60R 25/305; B60R 2325/108; G06K 19/06037
See application file for complete search history.

(56) References Cited

U.S. PATENT DOCUMENTS

| | | | | |
|---|---|---|---|---|
| 11,838,422 | B1 * | 12/2023 | Nam | G06Q 10/083 |
| 2019/0329733 | A1 * | 10/2019 | Ahmad | H04W 12/06 |
| 2020/0258478 | A1 * | 8/2020 | Mourou | G09G 5/36 |
| 2020/0282953 | A1 * | 9/2020 | Watanabe | B60R 25/252 |
| 2023/0264653 | A1 * | 8/2023 | Steinwald | G06F 21/31 |
| | | | | 340/5.61 |

* cited by examiner

*Primary Examiner* — Peter D Nolan
*Assistant Examiner* — Mikko Okechukwu Obioha
(74) *Attorney, Agent, or Firm* — Jeremy J. Klobucar

(57) ABSTRACT

A vehicle access system for a vehicle includes a telematics device disposed on the vehicle for communication with a portable electronic device via a network, the portable electronic device associated with the vehicle and configured to generate first and second security keys, and generate and display a QR code mapped from the first security key, the QR code configured to be authenticated by the second security key. An imaging device is disposed on the vehicle, and a vehicle controller is in signal communication with the telematics device and the imaging device. The vehicle controller is configured to perform operations including receiving the second security key to begin execution of an authentication process, detecting, with the imaging device, the QR code generated with the first security key, authenticating the QR code with the second security key, and upon authenticating the QR code, enabling access to a vehicle function.

20 Claims, 3 Drawing Sheets

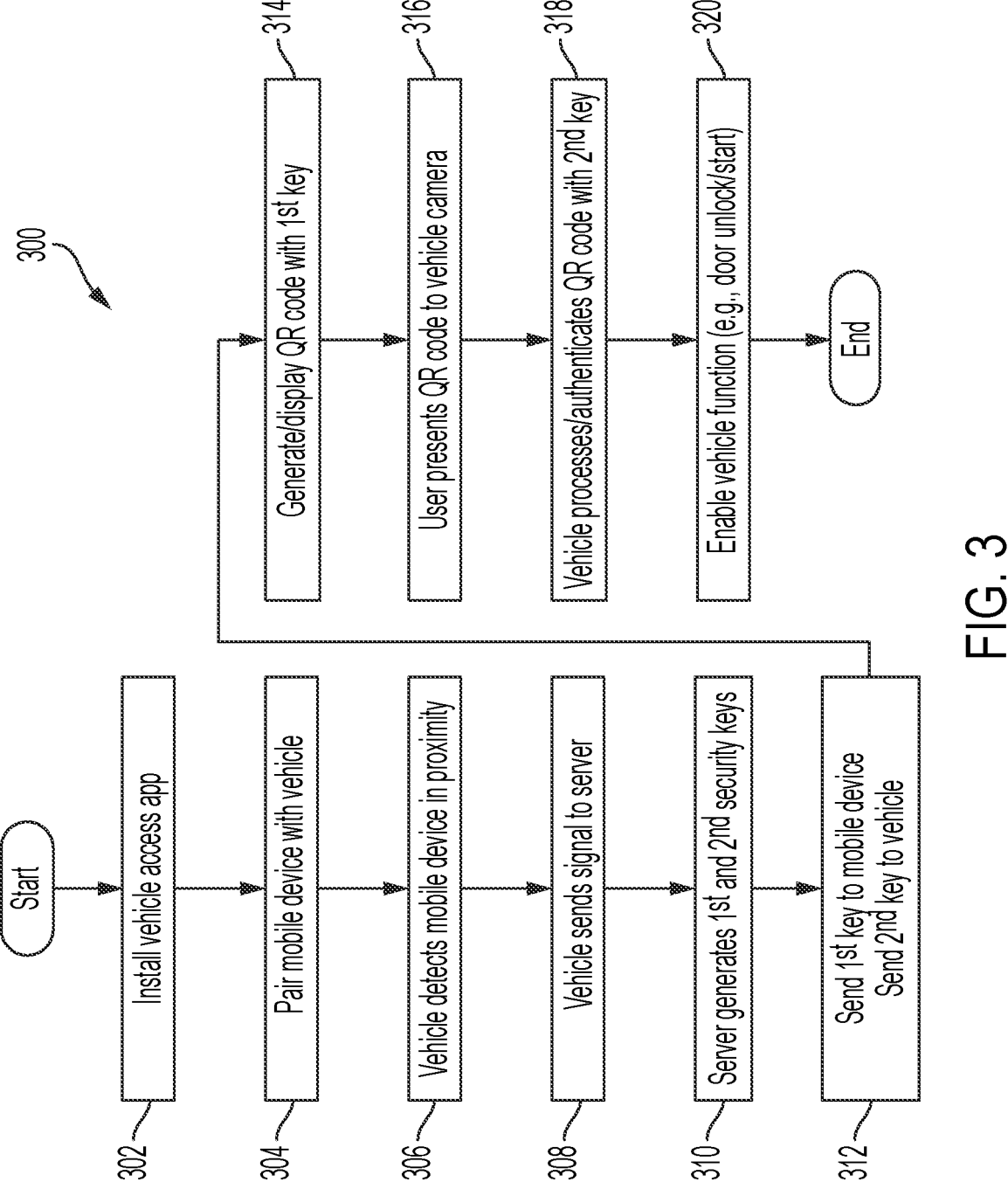

300

Start

Install vehicle access app — 302

Pair mobile device with vehicle — 304

Vehicle detects mobile device in proximity — 306

Vehicle sends signal to server — 308

Server generates 1st and 2nd security keys — 310

Send 1st key to mobile device
Send 2nd key to vehicle — 312

Generate/display QR code with 1st key — 314

User presents QR code to vehicle camera — 316

Vehicle processes/authenticates QR code with 2nd key — 318

Enable vehicle function (e.g., door unlock/start) — 320

End

FIG. 3

VEHICLE ACCESS SYSTEMS AND METHODS

FIELD

The present application relates generally to vehicle management systems and, more particularly, to vehicle access systems.

BACKGROUND

Many vehicles include passive entry systems that allow a user to enter and start the vehicle without a key, simply requiring the driver to carry a key fob. The systems are referred to as 'passive' because they do not require any action from the user. Conventional systems utilize a low frequency radio frequency identification (LF RFID) tag that provides short range communication, and an ultra-high frequency (UHF) transceiver for longer range communication. However, access is limited to those with physical possession of the key fob, preventing otherwise authorized users from accessing the vehicle without the key fob. Accordingly, while such systems do work well for their intended purpose, there remains a desire for improvement in the relevant art.

SUMMARY

In accordance with one example aspect of the invention, a vehicle access system for a vehicle is provided. In one example, the system includes a telematics device disposed on the vehicle and configured for communication with a portable electronic device via a network, the portable electronic device adapted to be associated with the vehicle and configured to generate first and second security keys, and generate and display a QR code mapped from the first security key, the QR code configured to be authenticated by the second security key. An imaging device is disposed on the vehicle, and a vehicle controller is in signal communication with the telematics device and the imaging device. The vehicle controller includes one or more processors and a non-transitory computer-readable storage medium having a plurality of instructions stored thereon, which, when executed by the one or more processors, cause the one or more processors to perform operations including receiving the second security key to begin executing an authentication process, detecting, with the imaging device, the QR code generated with the first security key, authenticating the QR code with the second security key, and upon authenticating the QR code, enabling access to a vehicle function.

In addition to the foregoing, the described vehicle access system may include one or more of the following features: wherein enabling access to a vehicle function comprises unlocking one or more doors of the vehicle to grant vehicle access to a user of the portable electronic device; wherein enabling access to a vehicle function further comprises enabling ignition start of the vehicle; wherein the first and second security keys are cryptographic keys; wherein the imaging device is a camera located on a door of the vehicle; and wherein the second security key is received from the portable electronic device via the network.

In addition to the foregoing, the described vehicle access system may include one or more of the following features: a transceiver disposed on the vehicle, and wherein the operations further include detecting, via the transceiver, if the portable electronic device comes within a predefined distance of the vehicle; sending, upon detecting the portable electronic device, a signal thereof to a secure server, which then generates and sends the first security key to the portable electronic device to generate the QR code; and receiving the second security key from the secure server.

In addition to the foregoing, the described vehicle access system may include one or more of the following features: wherein the transceiver is a Bluetooth transceiver, wherein the operations further include authenticating, via the imaging device, a biometric parameter of a user prior to enabling access to the vehicle function; and receiving a signal indicating the portable electronic device is within a predefined distance of a geographic location of the vehicle at a last ignition off, and waking up the telematics device in order to receive the second security key.

In accordance with another example aspect of the invention, a computer-implemented method for authorizing access to a vehicle is provided. In one example, the vehicle includes a telematics device configured for communication with a portable electronic device via a network, the portable electronic device adapted to be associated with the vehicle and configured to generate first and second security keys, and generate and display a QR code mapped from the first security key, the QR code configured to be authenticated by the second security key. The method includes receiving, at a vehicle controller having one or more processors, the second security key; detecting, with the imaging device, the QR code generated with the first security key; authenticating the QR code with the second security key; and upon authenticating the QR code, enabling access to a vehicle function.

In addition to the foregoing, the described method may include one or more of the following features: wherein enabling access to a vehicle function comprises unlocking one or more doors of the vehicle to grant vehicle access to a user of the portable electronic device; wherein enabling access to a vehicle function further comprises enabling ignition start of the vehicle; wherein the first and second security keys are cryptographic keys; wherein the imaging device is a camera located on a door of the vehicle; and wherein the second security key is received from the portable electronic device via the network.

In addition to the foregoing, the described method may include one or more of the following features: detecting, via a transceiver of the vehicle, if the portable electronic device comes within a predefined distance of the vehicle; sending, upon detecting the portable electronic device, a signal thereof to a secure server, which then generates and sends the first security key to the portable electronic device to generate the QR code; and receiving the second security key from the secure server; authenticating, via the imaging device, a biometric parameter of a user prior to enabling access to the vehicle function; and receiving a signal indicating the portable electronic device is within a predefined distance of a geographic location of the vehicle at a last ignition off; and waking up the telematics device in order to receive the second security key.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 3 is a flow diagram illustrating another example method of operating the vehicle access system, in accordance with the principles of the present application.

DETAILED DESCRIPTION

As previously discussed, vehicles equipped with passive entry systems, such as remote keyless entry (RKE) or remote keyless ignition (RKI), provide authorized access to a vehicle and various functions. However, such systems require specialized equipment (key fob) and access is limited to only those with physical possession of the key fob. This prevents authorized vehicle access, for example, if the key fob is lost or unavailable to another authorized individual. Accordingly, systems and methods are provided for granting access to a vehicle and its functions without a mechanical key or passive entry key fob.

Figure 1:
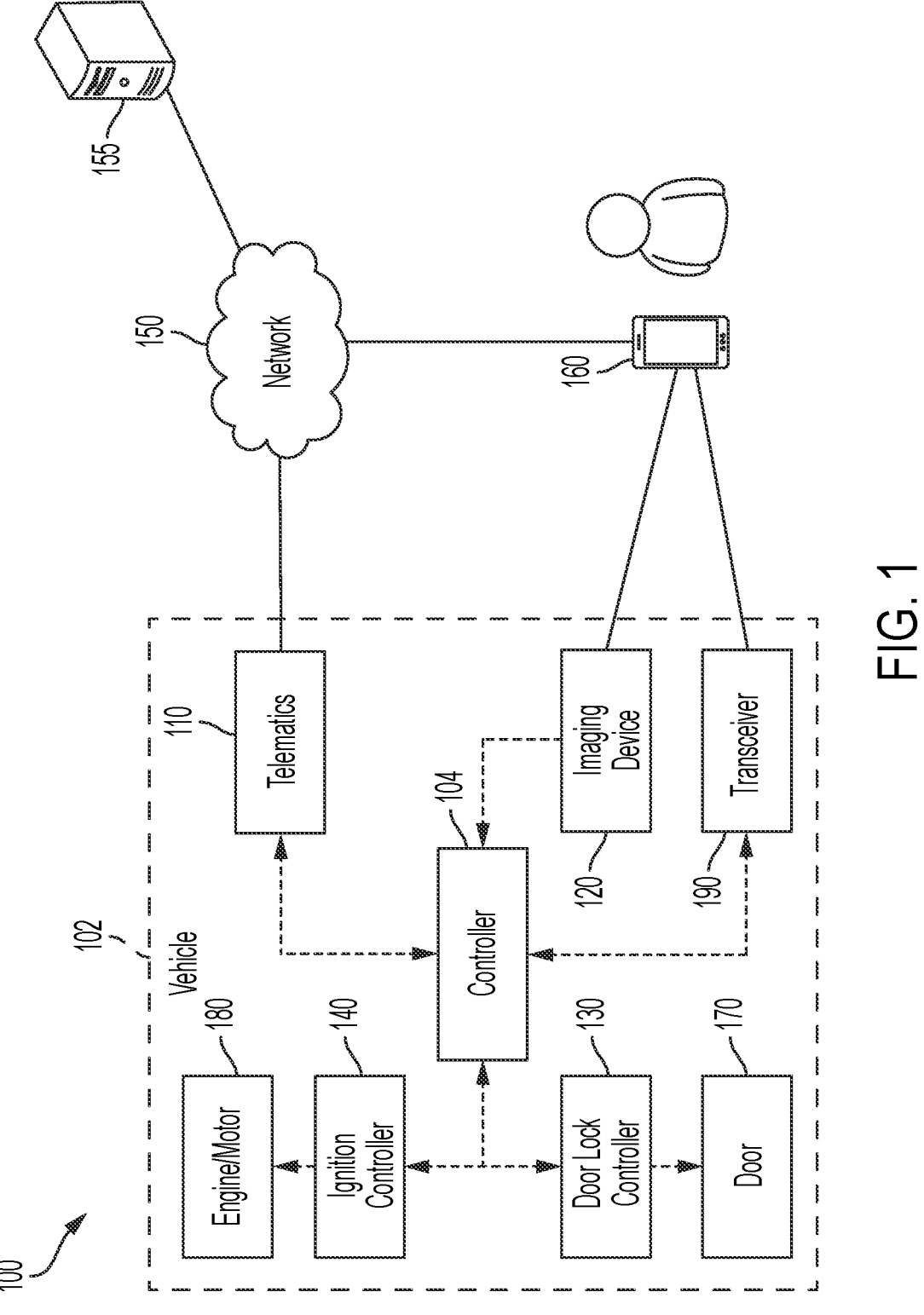
FIG. 1 is schematic diagram of an example vehicle access system in accordance with the principles of the present application.

With reference now to FIG. 1, an example vehicle access system 100 is illustrated in accordance with the principles of the present disclosure. In the example embodiment, the vehicle access system 100 is generally intended for remote entry/start of a vehicle 102 and will be described as such. However, it will be appreciated that vehicle access system 100 is not limited thereto and may be utilized with other vehicle features or access targets such as buildings, gates, doors, or other areas or objects where restricted access is desired.

In the example embodiment, vehicle access system 100 generally includes a computing device or controller 104 (e.g., ECU) in signal communication with a telematics device 110, an imaging device 120, a door lock controller 130, and an ignition controller 140. The controller 104 includes a processor and a memory and may be separate from or part of the telematics device 110. The telematics device 110 is a device designed to ensure the wireless connectivity of the vehicle 102 and enables the exchange of data with external infrastructure such as a network 150 and a portable electronic device 160 (e.g., smart phone, laptop computer, tablet computer, etc.). The network 150 can be any suitable communication network including, for example, a satellite network, a cellular network (3G, 4G LTE, 5G, etc.), a computing network (local area network, the internet, etc.), or some combination thereof.

In the example embodiment, the electronic device 160 is a computing device that includes a communication device (e.g., transceiver), a processor, a memory, and a display (not shown). The electronic device 160 is configured for communication via the network 150, and the processor is configured to control operation thereof. The term "processor" as used herein can refer to both a single processor and two or more processors operating in a parallel or distributed architecture. The memory can be any suitable storage medium (flash, hard disk, etc.) configured to store information at electronic device 160. In one implementation, the memory is a non-transitory computer-readable storage medium configured to store instructions executable by the processor to cause the electronic device 160 to perform at least a portion of the disclosed techniques. The display may be a touchscreen display configured to display one or more soft buttons (not shown) to facilitate performing at least a portion of the disclosed techniques. Moreover, the electronic device 160 is capable of installing and executing instructions from one or more computer applications.

The imaging device 120 is a device, such as a digital camera, configured to capture image data. In the particular example, the imaging device 120 is capable of scanning a machine-readable code, such as a barcode or a quick-response (QR) code, as described herein in more detail. The door lock controller 130 is configured to lock and unlock one or more vehicle doors 170 based on one or more signals from the controller 104. The ignition controller 140 is configured to start a vehicle engine or motor 180 based on one or more signals from the controller 104.

The vehicle access system 100 is configured to perform an authentication process to authorize and grant access to the vehicle 102 based on presentation of the portable electronic device 160 to the imaging device 120. The imaging device 120 is located on the vehicle 102 in a convenient location that enables a user to easily present the electronic device 160. For example, the imaging device 120 may be located on the vehicle door 170 (e.g., door handle) or side view mirror (not shown).

In the example embodiment, the electronic device 160 includes a vehicle access application, which is authenticated and associated with the vehicle 102. The vehicle access application is configured to generate a first security key and a second security key (e.g., cryptographic keys, encryption keys, public-private key pair, PKI, etc.). The first security key is utilized to generate a QR code on the electronic device 160, and the second security key is sent to the vehicle controller 104 via the network 150 and telematics device 110. The second security key is configured to authenticate the QR code generated by the first security key. In one example, to ensure maximum security, the vehicle access application is configured to periodically change the security keys, for example every thirty to sixty seconds.

In the example embodiment, a user shows the generated QR code, which is displayed on the electronic device 160, to the imaging device 120 located on the vehicle 102. The controller 104 receives signals from the imaging device 120 and is configured to authenticate the displayed QR code using the second security key. Upon authentication, the controller 104 sends a signal to door lock controller 130 to unlock the door(s) 170. The controller 104 may also send a signal to the ignition controller 140 to enable the user to start the vehicle engine/motor 180. In some examples, enabling vehicle start may require a different, newly generated QR code shown to an additional imaging device 120 located within the vehicle. In still other examples, the vehicle access system 100 may require an additional authentication/verification step after authenticating the QR code before the vehicle function is accessible. For example, the controller 104 may require further authentication/verification through facial or other biometric parameters (e.g., via imaging device 120, fingerprint sensor, etc.).

Figure 2:
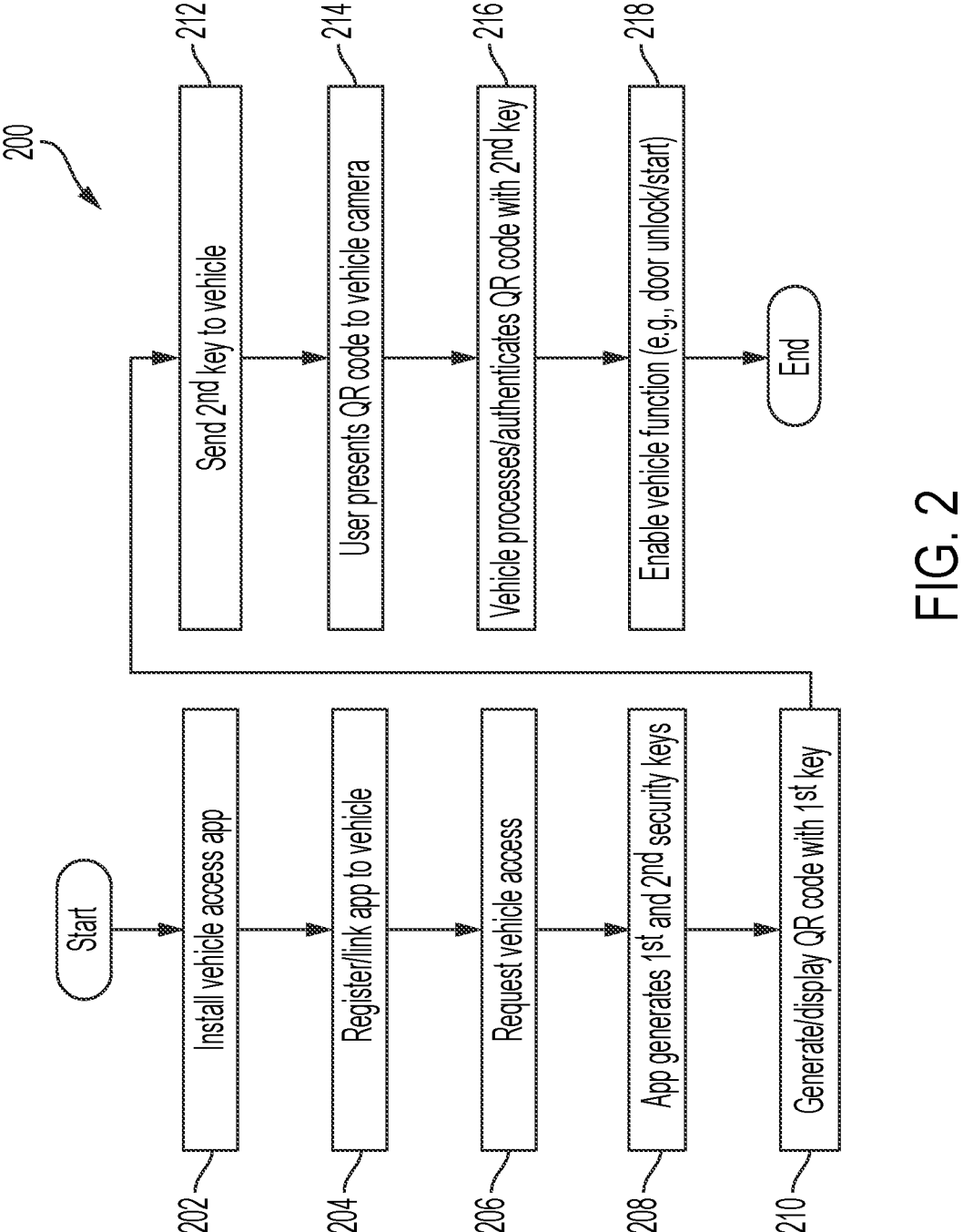
FIG. 2 is a flow diagram illustrating an example method of operating the vehicle access system, in accordance with the principles of the present application.

With reference now to FIG. 2, a flow diagram of an example method 200 of authorizing access to a vehicle function utilizing the vehicle access system 100 is illustrated. At step 202, a user installs the vehicle access application on the electronic device 160. At step 204, the vehicle access application is registered and linked to the specific vehicle 102. At step 206, the user opens the vehicle access application and requests access to vehicle 102. At step 208, the vehicle access application generates first and second security keys. At step 210, the vehicle access application generates a QR code based on the first security key, and displays the generated QR code on the screen of the electronic device 160.

At step 212, the vehicle access application sends the second security key to the vehicle controller 104 via the network 150 and telematics device 110. At step 214, the user presents the generated QR code to the vehicle imaging device 120. At step 216, using the second security key, the vehicle controller 104 processes and authenticates the generated QR code based on imaging data signals from the vehicle imaging device 120. At step 218, once the generated QR code is authenticated, the controller 104 unlocks door 170 via door lock controller 130, and/or enables vehicle ignition via the ignition controller 140. Control then ends.

With continued reference to FIG. 1, in another embodiment of the vehicle access system 100, the vehicle 102 further includes a wireless transceiver 190 (e.g., Bluetooth, Wi-Fi, etc.) for detection and ranging of the electronic device 160 when paired with the vehicle 102. The controller 104 is configured to transmit a continuous signal (e.g., Bluetooth signal) a predefined distance (e.g., five meters) via the transceiver 190. When the paired electronic device 160 comes within the predefined distance and receives the signal, the electronic device 160 is activated and responds back to the vehicle 102 via the transceiver 190 with a response signal acknowledging its presence in the vehicle vicinity.

When the electronic device 160 is detected, the controller 104 sends a signal via the telematics device 110 to the network 150, which is connected to a secure backend server 155. The secure backend server 155 may include one or more secure servers, which for example, are owned and operated by a particular vehicle original equipment manufacturer (OEM) and are only accessible to authorized users, such as through the vehicle access application.

Upon receiving the signal indicating the presence of the electronic device 160 near the vehicle 102, the secure backend server 155 generates a first security key and a second security key, each of which may be encrypted. The secure backend server 155 sends the first security key to the electronic device 160, which then utilizes the first security key to generate a QR code thereon. The secure backend server 155 sends the second security key to the vehicle controller 104 via the network 150 and telematics device 110. Alternatively, the secure backend server 155 sends the second security key to the electronic device 160, which then transmits the second security key to the controller 104 via transceiver 190. The second security key is configured to authenticate the QR code generated by the first security key. To ensure maximum security, the vehicle access application may be configured to periodically change the security keys, for example every thirty to sixty seconds. The user then shows the generated QR code to the vehicle imaging device 120 to access the vehicle 102, as previously described.

With reference now to FIG. 3, a flow diagram of an example method 300 of authorizing access to a vehicle function using the second embodiment of the vehicle access system 100 is illustrated. At step 302, a user installs the vehicle access application on the electronic device 160. At step 304, the electronic device 160 is paired with the vehicle 102. At step 306, the vehicle 102 detects the electronic device 160 within a predefined proximity of the vehicle 102. At step 308, the controller 104 sends a signal indicating the presence of the electronic device 160 to the secure backend server 155 via the telematics device 120 and network 150.

At step 310, the secure backend server 155 generates first and second security keys. At step 312, the secure backend server 155 sends the first security key to the electronic device 160 via the network 150, and sends the second security key to the vehicle controller 104 via the network 150 and telematics device 110. Alternatively, the secure backend server 155 sends the second security key to the electronic device 160, which then sends the second security key to the controller 104 via the transceiver 190.

At step 314, the vehicle access application generates a QR code based on the first security key, and displays the generated QR code on the screen of the electronic device 160. At step 316, the user presents the generated QR code to the vehicle imaging device 120. At step 318, using the second security key, the vehicle controller 104 processes and authenticates the generated QR code based on signals from the vehicle imaging device 120. At step 320, once the generated QR code is authenticated, the controller 104 unlocks door 170 via door lock controller 130, and/or enables vehicle 102 ignition via the ignition controller 140. Control then ends.

With continued reference to FIG. 1, yet another embodiment of the vehicle access system 100 is described. In the example embodiment, during ignition OFF, the vehicle 102 determines its geographic location (e.g., via GPS, geolocation, etc.) and sends a signal thereof to the secure backend server 155 and/or the electronic device 160. The vehicle access application subsequently compares a location of the electronic device 160 to the determined location of the vehicle 102 at the last ignition OFF. If the vehicle access application determines the electronic device 160 is near to the vehicle 102, the vehicle access application sends a wakeup to the vehicle telematics device 110 via the network 150 and/or the wireless transceiver 190. The user may then access the vehicle via the generated QR code as previously described herein.

Described herein are systems and methods to provide access to one or more vehicle features with a mobile device. The mobile device is configured to generate and display a QR code, which is then presented to a vehicle camera. The vehicle authenticates the QR code and subsequently provides access to vehicle functions, such as door unlock and engine start. As such, the vehicle access system does not require physical keys and utilizes existing vehicle features such as the camera. As mobile devices are typically carried by a user and considered relatively secure, vehicle access can be provided through the mobile device. Moreover, cryptographic keys may be utilized for QR code generation and authentication, adding additional security. Accordingly, the described system advantageously utilizes existing vehicle components to reduce hardware and software overhead, does not require a dedicated access ECU, and can be integrated into the vehicle telematics which remains active when other controllers are completely off during ignition off conditions.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A vehicle access system for a vehicle, comprising:
a telematics device disposed on the vehicle and configured for communication with a portable electronic device via a network, the portable electronic device adapted to be associated with the vehicle and configured to generate first and second security keys, and generate and display a QR code mapped from the first security key, the QR code configured to be authenticated by the second security key;
an imaging device disposed on the vehicle; and
a vehicle controller in signal communication with the telematics device and the imaging device, the vehicle controller including one or more processors and a non-transitory computer-readable storage medium having a plurality of instructions stored thereon, which, when executed by the one or more processors, cause the one or more processors to perform operations comprising:
receiving, from the portable electronic device, the second security key to begin execution of an authentication process;
detecting, with the imaging device, the QR code generated with the first security key and displayed on the portable electronic device;
authenticating the QR code with the second security key; and
upon authenticating the QR code, enabling access to a vehicle function.

2. The vehicle access system of claim 1, wherein enabling access to a vehicle function comprises unlocking one or more doors of the vehicle to grant vehicle access to a user of the portable electronic device.

3. The vehicle access system of claim 2, wherein enabling access to a vehicle function further comprises enabling ignition start of the vehicle.

4. The vehicle access system of claim 1, wherein the first and second security keys are cryptographic keys.

5. The vehicle access system of claim 1, wherein the imaging device is a camera located on a door of the vehicle.

6. The vehicle access system of claim 1, wherein the second security key is received from the portable electronic device via the network.

7. The vehicle access system of claim 1, further comprising a transceiver disposed on the vehicle, wherein the operations further comprise:
detecting, via the transceiver, a presence of the portable electronic device within a predefined distance of the vehicle; and
sending, upon detecting the portable electronic device, a signal thereof to a secure server, which then generates and sends the first security key to the portable electronic device to generate the QR code;
wherein the second security key is received from the secure server.

8. The vehicle access system of claim 7, wherein the transceiver is a Bluetooth transceiver, wherein the operations further comprise:
further authenticating, via the imaging device and an additional authentication step, a biometric parameter of an authorized user of the vehicle, after authenticating the QR code and prior to enabling access to the vehicle function.

9. The vehicle access system of claim 1, wherein the operations further comprise:
receiving a signal indicating the portable electronic device is within a predefined distance of a geographic location of the vehicle at a last ignition off; and
waking up the telematics device in order to receive the second security key.

10. A computer-implemented method for authorizing access to a vehicle having a telematics device configured for communication with a portable electronic device via a network, the portable electronic device adapted to be associated with the vehicle and configured to generate first and second security keys, and generate and display a QR code mapped from a first security key, the QR code configured to be authenticated by the second security key, the method comprising:
receiving, from the portable electronic device and at a vehicle controller having one or more processors, the second security key;
detecting, with the imaging device, the QR code generated with the first security key;
authenticating, by the controller, the QR code with the second security key; and
upon authenticating the QR code, enabling, by the controller, access to a vehicle function.

11. The method of claim 10, wherein enabling access to a vehicle function comprises unlocking, by the controller, one or more doors of the vehicle to grant vehicle access to a user of the portable electronic device.

12. The method of claim 11, wherein enabling access to a vehicle function further comprises enabling, by the controller, ignition start of the vehicle.

13. The method of claim 10, wherein the first and second security keys are cryptographic keys.

14. The method of claim 10, wherein the imaging device is a camera located on a door of the vehicle.

15. The method of claim 10, wherein the second security key is received from the portable electronic device via the network.

16. The method of claim 10, further comprising:
detecting, via a transceiver of the vehicle, a presence of the portable electronic device within a predefined distance of the vehicle; and sending, upon detecting the portable electronic device, a signal thereof to a secure server, which then generates and sends the first security key to the portable electronic device to generate the QR code;

wherein the second security key is received from the secure server.

17. The method of claim 16, further comprising:

further authenticating, via the imaging device and an additional authentication step, a biometric parameter of an authorized user of the vehicle, after authenticating the QR code and prior to enabling access to the vehicle function.

18. The method of claim 10, further comprising:

receiving a signal indicating the portable electronic device is within a predefined distance of a geographic location of the vehicle at a last ignition off; and waking up the telematics device in order to receive the second security key.

19. A vehicle access system for a vehicle, comprising:

a telematics device disposed on the vehicle and configured for communication with a portable electronic device via a network, the portable electronic device being authenticated and associated with the vehicle;

an imaging device disposed on the vehicle;

a transceiver; and a vehicle controller in signal communication with the telematics device and the imaging device, the vehicle controller including one or more processors and a non-transitory computer-readable storage medium having a plurality of instructions stored thereon, which, when executed by the one or more processors, cause the one or more processors to perform operations comprising:

detecting, via the transceiver, that a presence of the portable electronic device is within a predefined distance of the vehicle;

sending, upon detecting the portable electronic device, a signal thereof to a secure server, which in response generates and sends (i) a first encrypted security key to the portable electronic device and (ii) a second encrypted security key to the vehicle controller, wherein the portable electronic device generates and displays a QR code mapped from the first encrypted security key;

receiving, from the secure server, the second encrypted security key;

detecting, with the imaging device, the QR code generated with the first encrypted security key and displayed on the portable electronic device;

authenticating the QR code with the second encrypted security key; and upon authenticating the QR code, enabling access to a vehicle function.

20. The vehicle access system of claim 19, wherein the secure server sends the second encrypted security key to the portable electronic device, which then sends the second encrypted security key to the vehicle controller via the network.

* * * * *